United States Patent
Shen et al.

(10) Patent No.: US 7,055,679 B2
(45) Date of Patent: Jun. 6, 2006

(54) RECONFIGURABLE MAGNETIC FIXTURING PALLETS FOR AN ASSEMBLY LINE

(75) Inventors: Chi-Hung Shen, Troy, MI (US);
Yhu-Tin Lin, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/721,706

(22) Filed: Nov. 25, 2003

(65) Prior Publication Data

US 2005/0109590 A1    May 26, 2005

(51) Int. Cl.
*D65G 29/00*    (2006.01)
(52) U.S. Cl. .............................. 198/867.08; 198/867.11; 198/803.11; 269/8; 269/45; 269/900
(58) Field of Classification Search .......... 198/867.08, 198/867.11, 803.11, 803.14; 269/8, 9, 16, 269/24, 27, 289 R, 900, 45, 309
See application file for complete search history.

(56) References Cited

U.S. PATENT DOCUMENTS

| | | | | |
|---|---|---|---|---|
| 2,816,489 A | * | 12/1957 | Robbins et al. | 269/309 |
| 3,624,799 A | * | 11/1971 | Sotonyi | 269/8 |
| 3,711,929 A | * | 1/1973 | Blakey et al. | 269/8 |
| 4,616,796 A | * | 10/1986 | Inoue | 269/8 |
| 5,110,239 A | * | 5/1992 | Riley et al. | 409/125 |
| 6,644,637 B1 | | 11/2003 | Shen | |

* cited by examiner

*Primary Examiner*—Joe Dillon, Jr.
(74) *Attorney, Agent, or Firm*—Kathryn A. Marra

(57) ABSTRACT

A reconfigurable pallet that supports a structure includes a base and a modular stanchion. The modular stanchion is magnetically attachable to the base along x and y axes relative to a top surface of the base. The modular stanchion includes a support element that has a height along a z axis that is transverse to the x and y axes. The support element supports the structure.

22 Claims, 6 Drawing Sheets

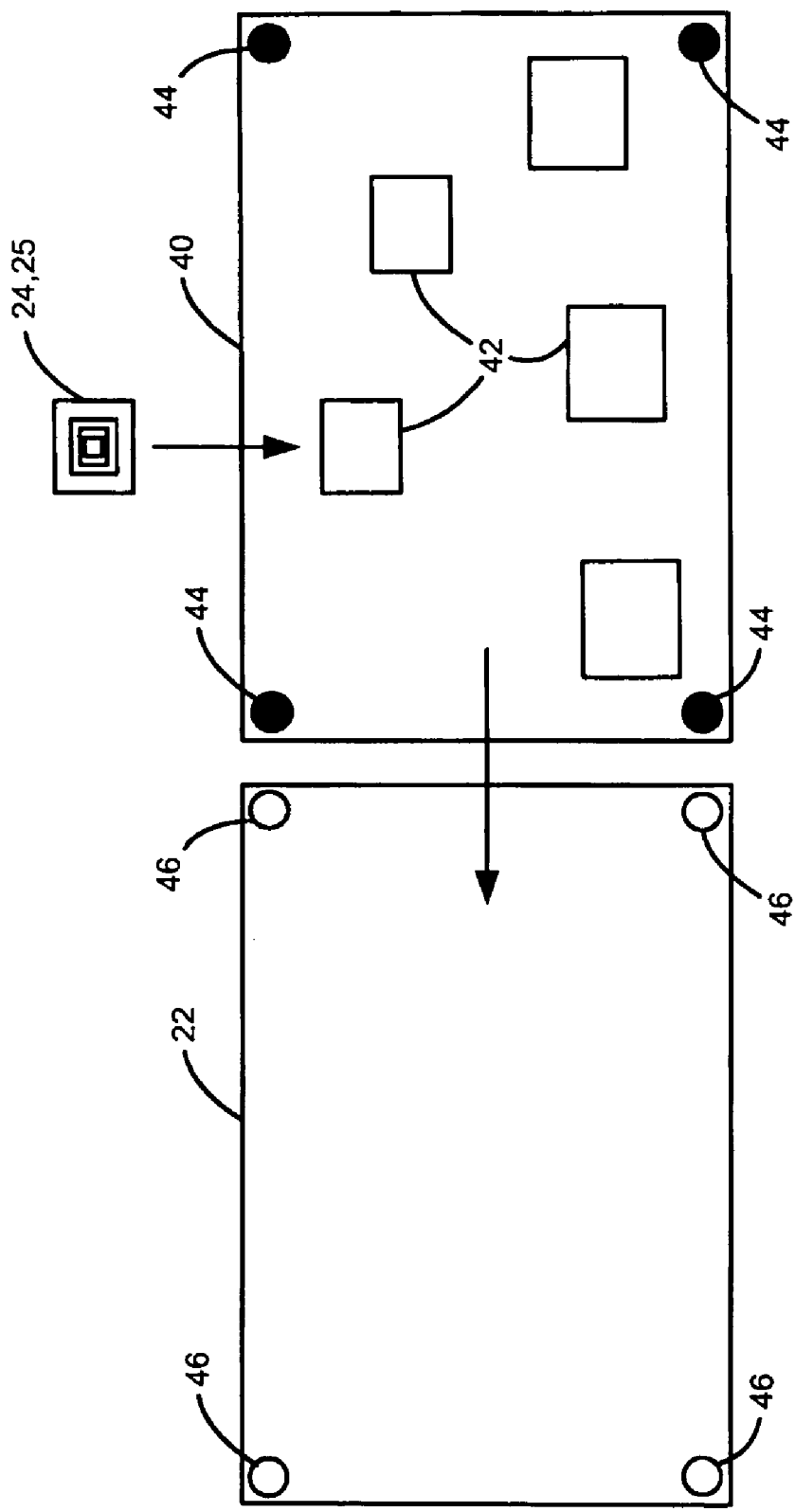

RECONFIGURABLE MAGNETIC FIXTURING PALLETS FOR AN ASSEMBLY LINE

FIELD OF THE INVENTION

The present invention relates to assembly lines, and more particularly to a reconfigurable pallet for an assembly line.

BACKGROUND OF THE INVENTION

The advent of assembly lines enabled rapid, mass production of products, reduced product cost. Assembly lines typically include multiple operation stages and component, material or sub-assembly inputs. Typically, a base structure is supported on a pallet that is transferred through the assembly line. Operations are performed on the base structure at the various operation stages to produce an end product. A single assembly line can be used to assemble varying product types. For example, an assembly line can be configured to assemble a first engine type and then reconfigured to assemble a second, different engine type.

Typical pallets include upward extending stanchions that are fixed to a base. The stanchions include support elements that support the base structure. Each stanchion is fixed in a specific location on the base and includes a fixed height to vertically position the support element at a required support location. Traditionally, a specific pallet corresponds to a specific product type. For example, for the first and second engine types introduced above, a first pallet includes a stanchion configuration that supports the first engine type. A second pallet includes a different stanchion configuration to support the second engine type.

Traditional pallets are not interchangeable across product types because each pallet is specifically designed to support a specific product type. Because a unique pallet is required for each product type production costs increase. Such production costs include costs associated with designing, manufacturing and purchasing of each pallet type. Further, capital investment and longer lead times are required when transitioning between product types.

SUMMARY OF THE INVENTION

Accordingly, the present invention provides a reconfigurable pallet that supports a structure. The reconfigurable pallet includes a base and a modular stanchion. The modular stanchion is magnetically attachable to the base along x and y axes preferably generally parallel to a top surface of the base. The modular stanchion includes a support element that has a height along a z axis that is transverse and preferably perpendicular to the x and y axes. The support element supports the structure.

In one feature, the support element is movable along the z axis to adjust the height.

In another feature, a hydraulic pump is in fluid communication with a support cylinder and is operable to adjust a hydraulic pressure within the support cylinder to move the support element along the z axis.

In another feature, the modular stanchion further includes a stanchion base that supports the support element.

In still another feature, the stanchion base includes a permanent magnet that is movable to a first position to secure the modular stanchion to the base.

In yet another feature, the stanchion base includes an electro-magnet embedded therein, wherein a current is applied to the electromagnet to selectively secure the modular stanchion to the base.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a schematic illustration of an assembly process for the reconfigurable pallet.

DETAILED DESCRIPTION OF THE PREFERRED EMBODIMENTS

The following description of the preferred embodiments is merely exemplary in nature and is in no way intended to limit the invention, its application, or uses.

Figure 1:
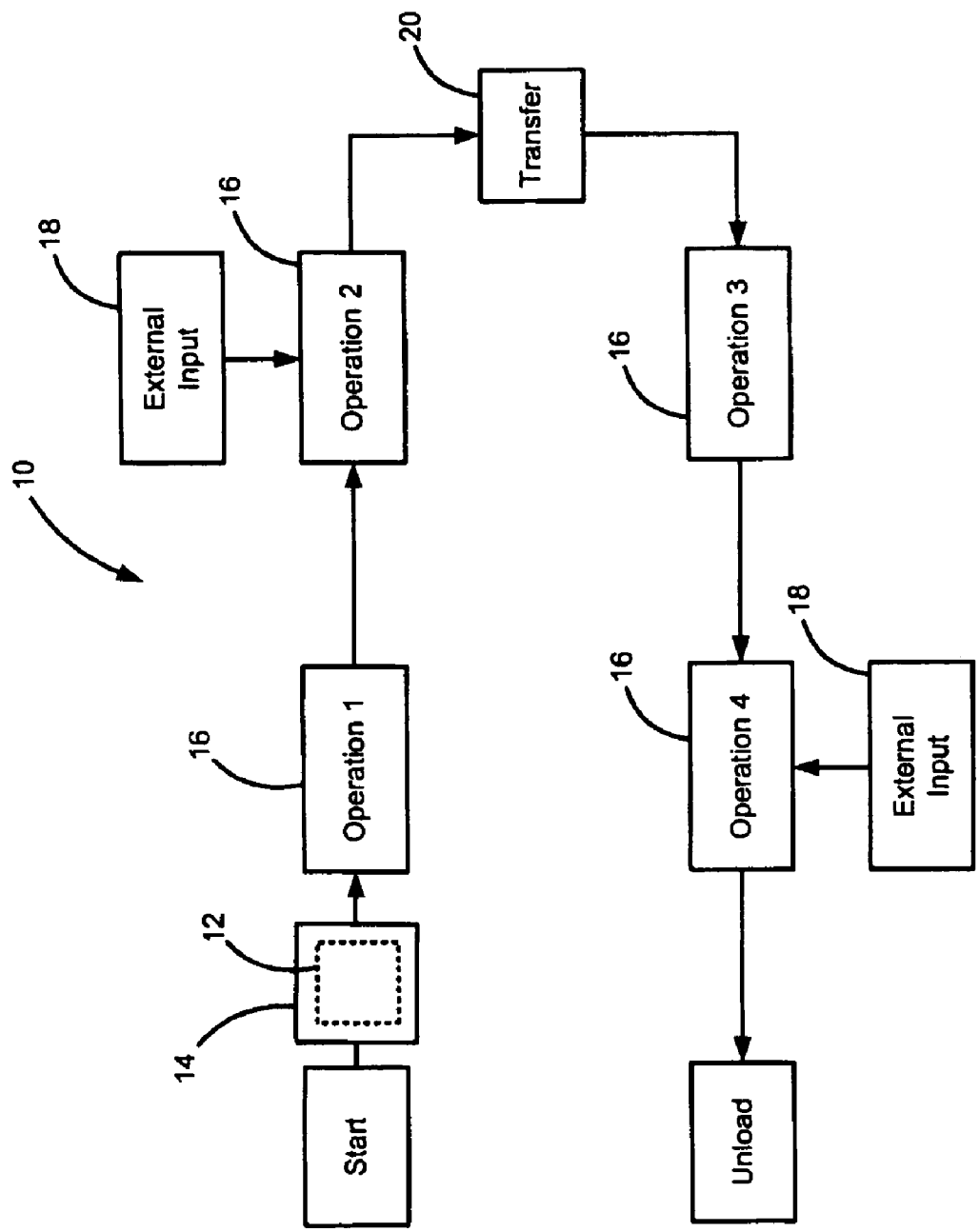
FIG. 1 is a schematic illustration of a generic assembly line.

Referring now to FIG. 1, a generic assembly line 10 is schematically illustrated. The assembly line 10 is illustrative of numerous types of assembly lines used across various industries. For example, the generic assembly line 10 can depict an engine, a chassis, a vehicle sub-assembly or any type of vehicle oriented assembly line. More broadly, the generic assembly line 10 can depict any type of assembly line across all industries.

A base structure 12 (shown in phantom) of a "to be assembled" product is moved through the assembly line 10 on a reconfigurable pallet 14. The generic assembly line 10 includes multiple operation stages 16. Single or multiple operations are performed on the product at each operation stage 16. Such operations include, but are not limited to assembling a component, welding, treating the base structure (e.g., heat treatment), applying sealant, adhesive or the like and packaging the assembled product for shipping. Other inputs 18 are also included such as a component input, a sub-assembly input or a material input. A transfer 20 is also provided to transfer the reconfigurable pallets 14 to other parts of the assembly line 10. It is appreciated that the assembly line 10 is merely exemplary in nature and can vary in configuration, the number of operation stages 16, the number and location of component, sub-assembly or material inputs 18, transfers 20 and the like.

Figure 2:
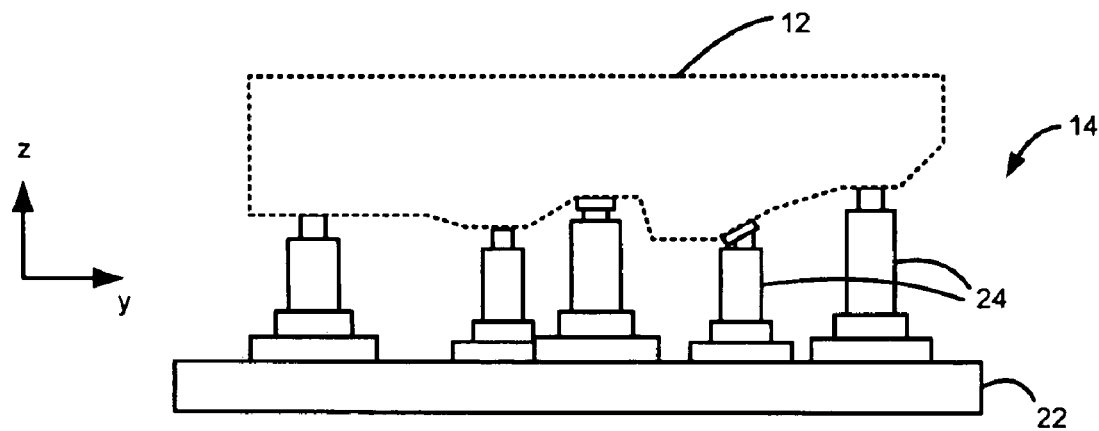
FIG. 2 is a schematic illustration of a reconfigurable pallet including modular stanchions.
Figure 3:
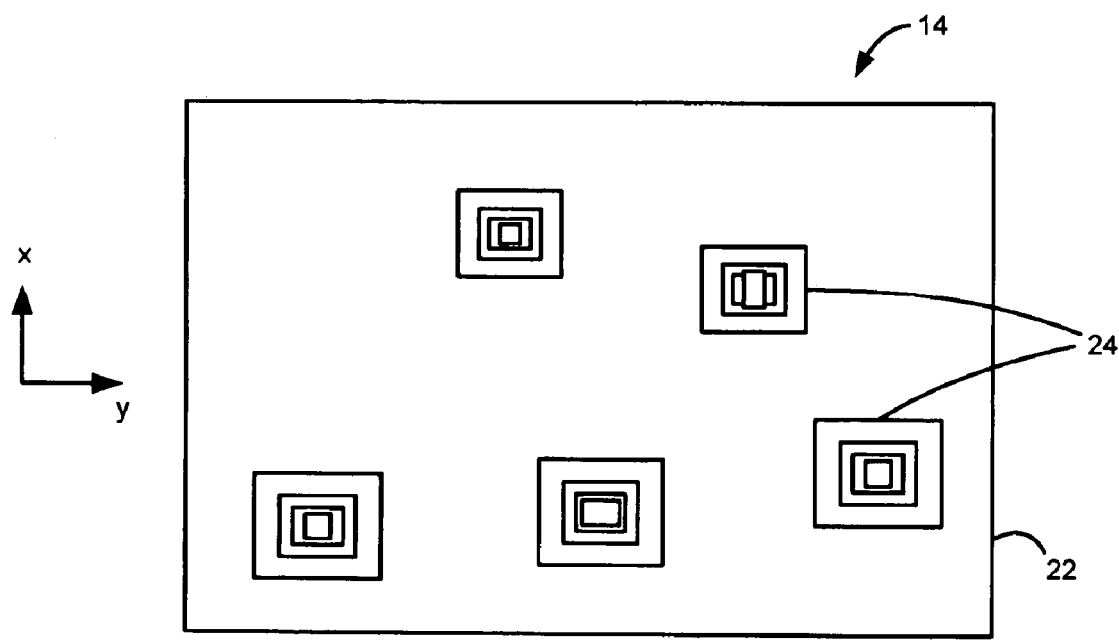
FIG. 3 is a top view of the reconfigurable pallet of FIG. 2.

Referring now to FIGS. 2 and 3, the reconfigurable pallet 14 is illustrated. The reconfigurable pallet 14 includes a base 22 that supports multiple modular stanchions 24. The base material corresponds to the loads it is designed to carry. For example, the base 22 can be made of a strong metal material to support heavier products such as an engine. Other materials can be used to construct the base 22. The material is selected based on the type of load that it is required to support. As described in further detail below, the modular stanchions 24 are selectively coupled to the base 22 using a magnetic coupling. Therefore, the base 22 is made of a magnetic or ferro-magnetic material such as steel.

The modular stanchions 24 are adjustable to support various product types and are moveable along x and y axes (see FIG. 3) and also along a z axis (see FIG. 2) transverse to the x and y axes. As further shown in FIG. 2, the positioning of the structure 12 or any portion of such structure is adjustable in all three directions, x, y and z. For example, the modular stanchions 24 can be arranged in a first configuration to support one engine type for assembly in the assembly line 10. The modular stanchions 24 can be reconfigured in a second configuration to accommodate a second engine type or another product altogether. In this manner, a single pallet 14 is reusable across assembly lines 10 and across products types.

Figure 4:
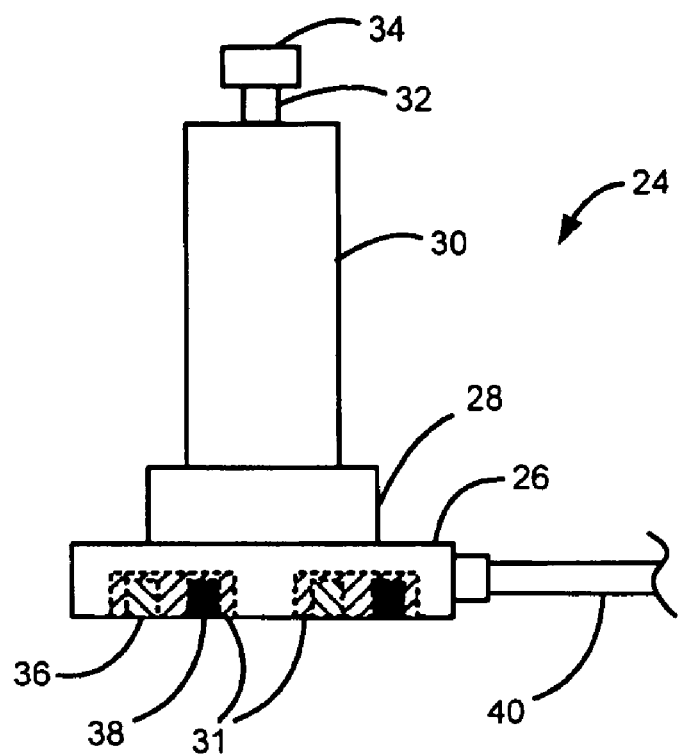
FIG. 4 is a schematic illustration of a modular stanchion of the reconfigurable pallet of FIGS. 2 and 3.

Referring now to FIG. 4, an exemplary modular stanchion 24 is shown. The modular stanchion 24 includes a stanchion base 26, a hydraulic fluid pump 28 and a support cylinder 30. The stanchion base 26 rests on the pallet base 22 and is selectively positionable along the x and y axes using magnetic chucks 31. The fluid pump 28 is supported on the stanchion base 26 and is in fluid communication with the support cylinder 30. The support cylinder 30 includes a rod 32 that has a support element 34 attached thereto. The rod 32 is laterally adjustable by varying the fluid pressure within the support cylinder 30.

The fluid pump 28 can be one of several types of fluid pumps known in the art including, but not limited to, a hydraulic screw-pump. Although not illustrated, a traditional hydraulic screw pump includes a hollow metal cylinder having a small opening at a closed end and a leak-free plunger screw-actuated at an open end. The small opening is connected to a hydraulic device such as a the support cylinder 30. When the plunger-screw is rotated clockwise, it moves axially inward, pressurizing the hydraulic fluid to actuate the hydraulic device. When the plunger-screw is rotated counterclockwise, it moves axially outward and thus decreases the fluid pressure and deactivates the hydraulic device. It is anticipated that the reservoir of oil inside the screw-pump can serve several hydraulic devices.

Actuation of the support cylinder 30 using the fluid pump 28 results in adjustment of the rod 32. Adjustment of the rod 32 enables positioning of the support element 34 along the z axis. In the event that the z axis position is outside of the range of the support cylinder 30, a gauge block or spacer (not shown) having an appropriate thickness can be implemented to raise the support cylinder 30. Alternatively, another support cylinder 30 having a longer stroke can be used.

The support elements 34 can vary in size and style between the modular stanchions 24. The support elements 34 include, but are not limited to, buttons, round locators, diamond locators and pads. The support elements 34 can be interchanged on the rods 32 of the support cylinders 30 and can be fixedly attached to the base structure 12 to secure the base structure 12 to the reconfigurable pallet 14. Additionally, such as in the case of a pad, the base structure 12 can rest on the support elements 34, held in place by gravity. It is also anticipated that the support elements 34 can be articulated in all directions to support the contour of the base structure 12.

Although the exemplary modular stanchion 24 includes hydraulic adjustment of the support element 34 along the z axis, it is anticipated that other mechanisms can be incorporated to achieve lateral adjustment of the support element 34. For example, a mechanical mechanism such as a rack and pinion system driven by an electric motor can be employed to position the support element 34 along the z axis. Alternatively, an adjustable tube that is slidable along the z axis and lockable in position by a pin can be implemented.

Figure 5:
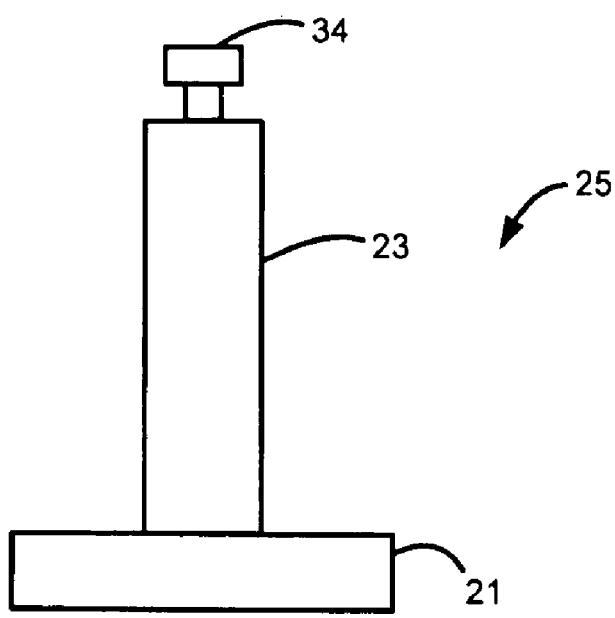
FIG. 5 is a schematic illustration of a fixed height modular stanchion.

With reference to FIG. 5, it is further anticipated that fixed height modular stanchions 25 can be implemented. The fixed height stanchions 25 each include a stanchion base 21, a support column 23 and the support element 34. Although the support elements 34 can be interchanged, the height of the support column 23 is fixed. This height can vary from stanchion 25 to stanchion 25. For a given product type the z-axis coordinates for the various support elements 34 can be predefined. The fixed height stanchions 25 having the required z-axis height can be selected from a pool of fixed height stanchions 25 and can be mounted to the pallet base 22 to support the product.

Figure 6:
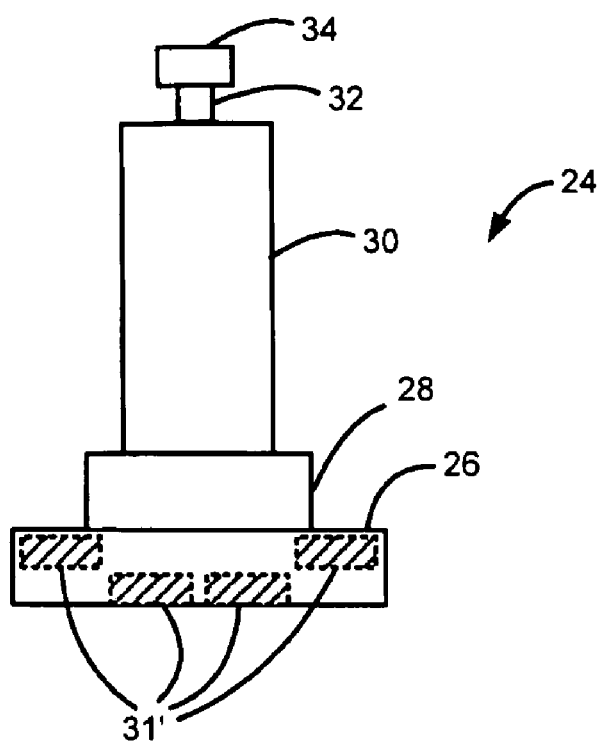
FIG. 6 is a side view of a base of the modular stanchions.
Figure 7:
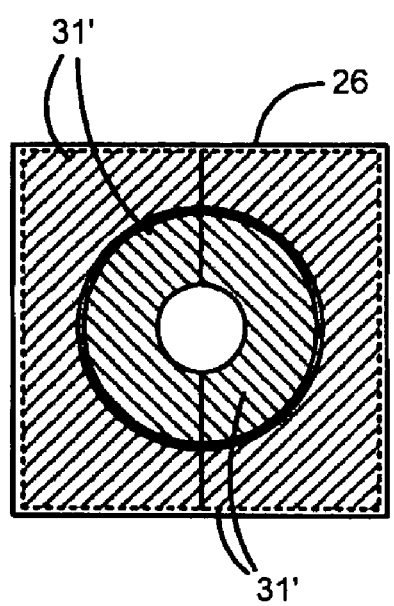
FIG. 7 is a bottom view of the base of the modular stanchions of FIG. 6.

Referring now to FIGS. 6 through 9, the modular stanchions 24,25 are selectively attached to the base using the magnetic chucks 31. FIGS. 6 and 7 illustrate mechanically actuated magnetic chucks 31'. Rectangular magnetic chucks 31' include semi-circular reliefs therein. Half donut-shaped magnetic chucks 31' are located in the relief area. The semi-circular magnetic chucks 31' can be rotated by mechanical means (not shown) to induce magnetic coupling of the stanchion base 26 to the pallet base 22. The mechanical means can include any type of mechanical mechanism known in the art, such as a lever and a cam mechanism. Although the magnetic chucks 31' are illustrated as rectangular or semi-circular, it is appreciated that the magnetic chucks 31' can take other shapes.

Figure 8:
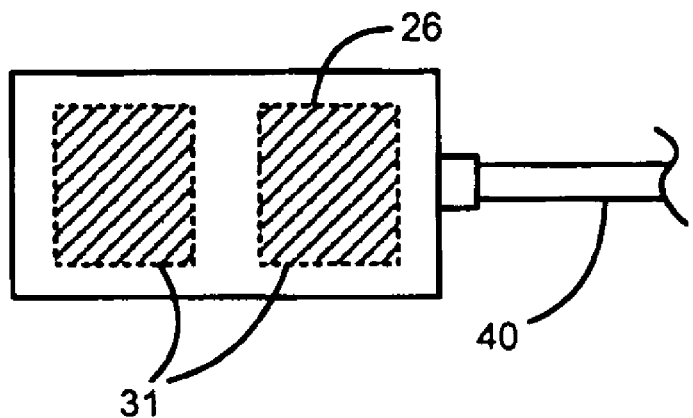
FIG. 8 is a bottom view of an alternative base of the modular stanchions.
Figure 9:
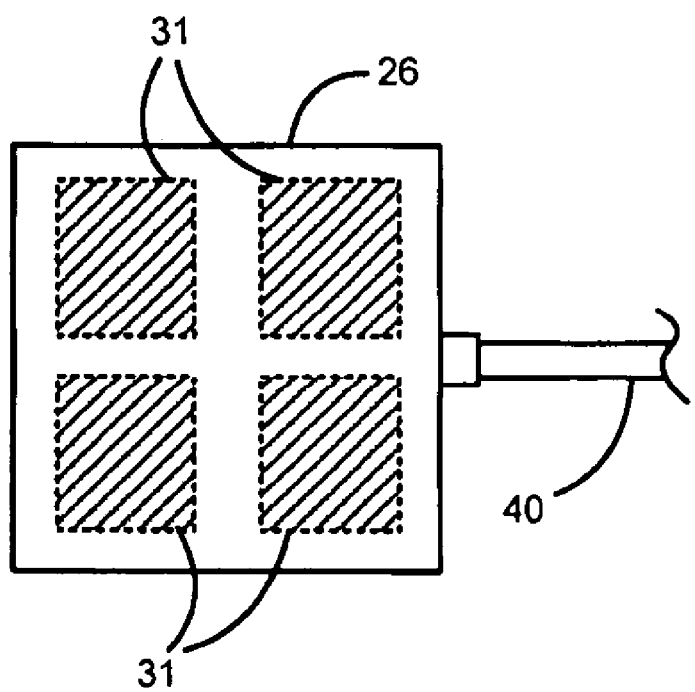
FIG. 9 is a bottom view of another alternative base of the modular stanchions.

Referring now to FIGS. 8 and 9, the magnetic chucks 31 are modular electro-permanent magnetic chucks. FIG. 8 illustrates rectangular magnetic chucks 31 in a 2-pole configuration and FIG. 9 illustrates a 4-pole configuration. It is anticipated that a single-pole or multiple-pole magnetic chuck configuration can be implemented. The compact length and width dimensions of the magnetic chucks 31 enable several magnetic chucks 31 per modular stanchion 24,25 to be magnetically attached to the base 22.

Referring again to FIG. 4, the magnetic chucks 31 include embedded electromagnets 36 and permanent magnets 38. The electro-magnets are selectively actuated to neutralize or reinforce the magnetic field of the permanent magnets. The magnetic chucks 31 are selectively coupled to a power source (not shown) via a cable 40. A one-time application of power is needed to either activate or deactivate the magnetic chucks 31. That is to say, the cable 40 can be detached and the magnetic chucks 31 will remain either magnetized or de-magnetized indefinitely. The magnetic force of the magnetic chucks 31 is sufficient to prohibit slippage of the modular stanchions 24,25 in the x-y plane, even under heavy loads.

Referring again to FIGS. 5 and 6, the magnetic chucks 31' are permanent magnet magnetic chucks. That is to say, the rectangular shaped magnetic chucks 31' induce a magnetic field and the half donut-shaped magnetic chucks 31' induce a separate magnetic field. When the magnetic chucks 31' are aligned, the modular stanchion 24,25 is in a neutral state and is not magnetically attached to the pallet base 22. When one or the other magnetic chuck 31' is rotated, the modular stanchion 24,25 is in an energized state and is magnetically attached to the pallet base 22.

Prior to use in the assembly line 10, the reconfigurable pallet 14 is configured to support the specific base structure 12 and product to be assembled. More specifically, the x, y and z positions of each modular stanchion 24,25 are adjusted or set and the support element 34 geometries are configured for the specific support requirements of the base structure 12.

Referring now to FIG. 10, a process for attaching a modular stanchion 24,25 to the pallet base 22 will be described in detail. A prefabricated pre-form 40 is mounted to the pallet base 22 to define the x-y coordinates for each of the modular stanchions 24,25. More particularly, the pre-form 40 functions as a template having a plurality of openings 42 that define a pattern. The pre-form 40 also includes locating pins 44 that interface with locating holes 46 on the pallet base 22 to center the pre-form 40 on the pallet base 22.

The pre-form 40 is set atop the pallet base 22 with the locator pins 44 and holes 46 centering the pre-form 40 on the pallet base 22. The modular stanchion 24,25 is set atop the pallet base 22 through the desired opening 42 and the is magnetically energized to secure the modular stanchion 24 to the pallet base 22. Once all of the required modular stanchions 24 are secured to the pallet base 22, the pre-form 40 is lifted off and the pallet 14 is ready to be used. After use, the modular stanchions 24 are de-energized and are removed from the pallet base 22. The pallet base 22 is cleaned and prepared to receive an alternative modular stanchion configuration.

An alternative process for attaching the modular stanchion 24,25 to the pallet base can include a modified computer numerically controlled (CNC) x-y table or a robotic arm. The CNC table or robotic arm position the modular stanchions 24,25 at the appropriate x-y coordinates. The stanchion bases 26 are secured in position as described above. An operator adjust the z-coordinate of each modular stanchion 24 in the case of an adjustable height modular stanchion 24. Adjustment of the z-coordinate can be achieved hydraulically or manually, as described above. The operator re-checks the x, y and z coordinates of each modular stanchion 24,25 then releases the reconfigurable pallet 14 for use in the assembly line 10.

The reconfigurable pallet 14 of the present invention enables multiple spatial positioning for locating pins or support pads. Thus, the reconfigurable pallet 14 is adjustable to accommodate various product types. In this manner, significant savings is obtained by reducing design, engineering, manufacturing and purchasing of pallets for each product type. Further savings are achieved in the form of reduced capital investment and lead-time during transition between products.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reconfigurable pallet that supports a structure, comprising:
   a pallet base; an
   a plurality of modular stanchions having magnets therein to magnetically attach said modular stanchions to said pallet base along x and y axes relative to a top surface of said pallet base, said modular stanchions each including a support element having a height along a z axis that is transverse to said x and y axes, said support element supporting said structure; and
   a pre-form that is selectively overlayed on said pallet base to define a unique position of each of said modular stanchions along said x and y axes.

2. The reconfigurable pallet system of claim 1 wherein said support element is movable along said z axis to adjust said height.

3. The reconfigurable pallet system of claim 2 further comprising a hydraulic pump in fluid communication with a support cylinder and operable to adjust a hydraulic pressure within said support cylinder to move said support element along said z axis.

4. The reconfigurable pallet system of claim 1 wherein said modular stanchion further comprises a stanchion base that supports said support element.

5. The reconfigurable pallet system of claim 4 wherein said magnets of said stanchion base comprise a permanent magnet that is embedded therein and that is selectively moved to a first position to secure said modular stanchion to said pallet base.

6. The reconfigurable pallet system of claim 4 wherein said stanchion base includes an electromagnet embedded therein, wherein a current is selectively applied to said electromagnet to secure said modular stanchion to said base.

7. A pallet system that is configurable to support first structure and reconfigurable to support a second structure, comprising:
   a pallet base;
   a modular stanchion that is magnetically attachable to said pallet base and positionable along x and y axes relative to a top surface of said pallet base and that includes a support element having a height along a z axis that is transverse to said x and y axes, said support element having a first position to support said first structure and having a second position to support said second structure; and
   a pre-form that is selectively overlayed on said pallet base to define a unique position of said modular stanchion along said x and y axes.

8. The pallet system of claim 7 wherein said support element is movable along said z axis to adjust said height.

9. The pallet system of claim 8 further comprising a hydraulic pump in fluid communication with a support cylinder and operable to adjust a hydraulic pressure within said support cylinder to move said support element along said z axis.

10. The pallet system of claim 7 wherein said modular stanchion further comprises a stanchion base that supports said support element.

11. The pallet system of claim 10 wherein said stanchion base includes a permanent magnet that is movable to a first position to secure said modular stanchion to said pallet base.

12. The pallet system of claim 10 wherein said stanchion base includes an electro-magnet embedded therein, wherein a current is selectively applied to said electro-magnet to secure said modular stanchion to said pallet base.

13. A reconfigurable pallet system that is configurable to support multiple structures, comprising:
   a pallet base;
   a modular stanchion that comprises:
      a stanchion base that is magnetically attachable to said pallet base along x and y axes relative to a top surface of said pallet base; and a support element that is supported on said stanchion base and that has a heigth transverse to said x and y axes along a z axis, said support element having a first position to support a first structure and having a second position to support second structure; and a pre-form that is selectively overlayed on said pallet base to define a unique position of said modular stanchion along said x and y axes.

14. The reconfigurable pallet system of claim 13 wherein said support element is movable along said z axis to adjust said height.

15. The reconfigurable pallet system of claim 13 further comprising a hydraulic pump in fluid communication with a support cylinder and operable to adjust a hydraulic pressure within said support cylinder to move said support element along said z axis.

16. The reconfigurable pallet system of claim 13 wherein said stanchion base includes a permanent magnet that is movable to a first position to secure said modular stanchion to said pallet base.

17. The reconfigurable pallet system of claim 13 wherein said stanchion base includes an electro-magnet embedded therein, wherein a current is selectively applied to said electromagnet to secure said modular stanchion to said pallet base.

18. An assembly line for assembling a product, comprising:

a plurality of operation stages; and a pallet that supports a base structure of said product and that carries said base structure between operation stages, comprising:

a pallet base;

a stanchion base that is magnetically attachable to said pallet base along x and y axes relative to a top surface of said pallet base;

a support element that is supported on said stanchion base and that has a height transverse to said x and y axes along a z axis, said support element locatable in a first position to support said base structure; and a pre-form that is selectively overlayed on said pallet base to define a unique position of said stanchion base along said x and y axes.

19. The assembly line of claim 18 wherein said support element is movable along said z axis to adjust said height.

20. The assembly line of claim 19 further comprising a hydraulic pump in fluid communication with a support cylinder and operable to adjust a hydraulic pressure within said support cylinder to move said support element along said z axis.

21. The assembly line of claim 18 wherein said stanchion base includes a permanent magnet that is movable to a first position to secure said modular stanchion to said pallet base.

22. The assembly line of claim 18 wherein said stanchion base includes an electromagnet embedded therein, wherein a current is selectively applied to said electromagnet to secure said modular stanchion to said pallet base.

* * * * *